United States Patent
Usami et al.

(10) Patent No.: US 10,794,568 B2
(45) Date of Patent: Oct. 6, 2020

(54) PLANT-GROWTH LAMINATED FILM AND PLANT-GROWTH ILLUMINATION APPARATUS

(71) Applicant: FUJIFILM Corporation, Tokyo (JP)

(72) Inventors: Yoshihisa Usami, Ashigara-kami-gun (JP); Mitsuyoshi Ichihashi, Ashigara-kami-gun (JP); Kazuhiro Oki, Ashigara-kami-gun (JP)

(73) Assignee: FUJIFILM Corporation, Minato-ku, Tokyo (JP)

(*) Notice: Subject to any disclaimer, the term of this patent is extended or adjusted under 35 U.S.C. 154(b) by 95 days.

(21) Appl. No.: 16/272,058

(22) Filed: Feb. 11, 2019

(65) Prior Publication Data
US 2019/0178470 A1 Jun. 13, 2019

Related U.S. Application Data

(63) Continuation of application No. PCT/JP2017/025710, filed on Jul. 14, 2017.

(30) Foreign Application Priority Data

Aug. 15, 2016 (JP) ................... 2016-159272

(51) Int. Cl.
| | |
|---|---|
| *F21V 9/14* | (2006.01) |
| *A01G 7/04* | (2006.01) |
| *G02B 27/28* | (2006.01) |
| *A01G 9/14* | (2006.01) |

(52) U.S. Cl.
CPC ............... *F21V 9/14* (2013.01); *A01G 7/045* (2013.01); *A01G 9/1438* (2013.01); *G02B 27/286* (2013.01)

(58) Field of Classification Search
CPC .......... F21V 9/14; A01G 7/045; A01G 9/1438; G02B 27/1286
See application file for complete search history.

(56) References Cited

U.S. PATENT DOCUMENTS 9,759,600 B2 * 9/2017 Ichihashi .............. G02B 5/3016
2009/0242834 A1 10/2009 Hoshino et al.
(Continued)

FOREIGN PATENT DOCUMENTS

| EP | 2700870 A1 | 2/2014 |
|---|---|---|
| EP | 2700871 A1 | 2/2014 |

(Continued)

OTHER PUBLICATIONS

Communication dated Jun. 13, 2019, from the European Patent Office in counterpart European Application No. 17841319.1.
(Continued)

*Primary Examiner* — Mary Ellen Bowman
(74) *Attorney, Agent, or Firm* — Sughrue Mion, PLLC

(57) ABSTRACT

Provided are a plant-growth laminated film and a plant-growth illumination apparatus that more efficiently provide circularly polarized light used for plant growth. Included are a reflective-type linearly polarizing plate that transmits one of linearly polarized light components of incident light and that reflects the other linearly polarized light component, and a λ/4 plate that converts, into circularly polarized light, linearly polarized light provided by transmission through the reflective-type linearly polarizing plate, wherein the λ/4 plate has an in-plane retardation of 165±40 nm at a wavelength of 660 nm.

8 Claims, 1 Drawing Sheet

(56) References Cited

U.S. PATENT DOCUMENTS

| | | | |
|---|---|---|---|
| 2012/0169950 A1 | 7/2012 | Tatzel et al. | |
| 2014/0041295 A1* | 2/2014 | Usami | F21V 9/14 47/58.1 LS |
| 2014/0041296 A1* | 2/2014 | Ichihashi | A01G 7/045 47/58.1 LS |
| 2015/0075069 A1* | 3/2015 | Ichihashi | F21V 9/14 47/17 |
| 2015/0101246 A1* | 4/2015 | Usami | F21V 9/14 47/58.1 LS |

FOREIGN PATENT DOCUMENTS

| | | |
|---|---|---|
| JP | 2012-223163 A | 11/2012 |
| JP | 2012-226229 A | 11/2012 |
| JP | 2013-243971 A | 12/2013 |
| JP | 2014-000049 A | 1/2014 |
| JP | 2014-507676 A | 3/2014 |
| WO | 2008/018560 A1 | 2/2008 |
| WO | 2015/033932 A1 | 3/2015 |

OTHER PUBLICATIONS

International Search Report of PCT/JP2017/025710 dated Oct. 3, 2017.
International Preliminary Report on Patentability with English Translation of the Written Opinion of PCT/JP2017/025710 dated Feb. 19, 2019.
Written Opinion of PCT/JP2017/025710 dated Oct. 3, 2017.

* cited by examiner

PLANT-GROWTH LAMINATED FILM AND PLANT-GROWTH ILLUMINATION APPARATUS

CROSS-REFERENCE TO RELATED APPLICATIONS

This application is a Continuation of PCT International Application No. PCT/JP2017/025710 filed on Jul. 14, 2017, which claims priority under 35 U.S.C. § 119(a) to Japanese Patent Application No. 2016-159272 filed on Aug. 15, 2016. The above application is hereby expressly incorporated by reference, in its entirety, into the present application.

BACKGROUND OF THE INVENTION

1. Field of the Invention

The present invention relates to a plant-growth laminated film and a plant-growth illumination apparatus.

2. Description of the Related Art

Plant factories, which are systems for producing plants in accordance with plans within enclosed or semi-enclosed spaces in which the internal environment is controlled, have been configured to control growth by adjusting temperature, fertilizer, light irradiation time, and illuminance, for example.

In these years, there have been reports on, in such plant factories, methods of controlling the quality of light to promote growth of plants.

It is known that growth of plants is promoted by red circularly polarized light.

Plants have various light-absorbing compounds, which contribute to growth of plants or generation of useful substances or compounds. A large number of such light-absorbing compounds have chirality, and have circular dichroism of providing absorption differences between right-circularly-polarized light and left-circularly-polarized light. Thus, irradiation with the readily absorbed circularly polarized light promotes growth of plants.

For example, chlorophyll has an absorption peak at about 660 nm. Thus, irradiation with circularly polarized light at about 660 nm promotes growth.

Thus, there have been proposed illumination apparatuses configured to radiate polarized light to promote growth of plants.

For example, JP2012-223163A describes an illumination device including a light-emitting light source; a reflective-type polarizing plate that transmits one of the polarization components of incident light from the light-emitting light source, and reflects the other polarization component; reirradiation means for changing a polarization state of the light reflected from the reflective-type polarizing plate to reirradiate the reflective-type polarizing plate with the light; and circular polarization conversion means for converting the light having been transmitted through the reflective-type polarizing plate into circularly polarized light.

In addition, JP2013-243971A describes a system for irradiating a target object selectively with specific circularly polarized light, the system including a polarization-state control member that controls the polarization state of light to generate circularly polarized light, and a circularly polarized light-reflecting member, wherein the circularly polarized light-reflecting member is disposed at a position on which circularly polarized light emitted from the polarization-state control member can be incident, the circularly polarized light-reflecting member generates reflected light that selectively includes circularly polarized light of the same sense as the incident circularly polarized light from the polarization-state control member, and the circularly polarized light-reflecting member is disposed such that the target object can be irradiated with at least a part of the reflected light.

In addition, JP2014-000049A describes an illumination apparatus for plant cultivation, including means configured to change light in any wavelength region of 300 nm or higher and 600 nm or lower into light in a wavelength region including dominantly a right-circularly-polarized light component.

JP2012-223163A, JP2013-243971A, and JP2014-000049A above state that, as members for converting light from a light source into circularly polarized light, a linearly polarizing plate and a λ/4 plate are used.

SUMMARY OF THE INVENTION

However, irradiation with red light alone may cause adverse effects on the morphologies such as the shape of leaves.

Since absence of any light of wavelengths not corresponding to red light in growth of plants results in, for example, alteration of the morphologies, cultivation with red light alone is not preferred. For this reason, irradiation is preferably performed together with light of another wavelength, for example, blue light at about 460 nm. Thus, light sources are configured to radiate light over wide wavelength ranges. However, it is difficult to provide increased circular polarization efficiency over such a wide emission wavelength range. For this reason, the wavelength of the highest reflection efficiency of the polarizing plate and/or the wavelength of the highest circular polarization efficiency of the λ/4 plate has been set to about the center of the emission wavelength range of the light source (for example, at about 550 nm) to thereby ensure the circular polarization efficiency over the entirety of the emission wavelength range. However, this has not been sufficient.

Under the above-described circumstances, an object of the present invention is to provide a plant-growth laminated film and a plant-growth illumination apparatus that more efficiently provide circularly polarized light used for growth of plants.

The inventors of the present invention performed thorough studies on the problems of the related art. As a result, the inventors have found that the above-described object is achieved with a configuration having a reflective-type linearly polarizing plate that transmits a first linearly polarized light component of incident light, and that reflects a second linearly polarized light component orthogonal to the first linearly polarized light component, and a λ/4 plate that converts, into circularly polarized light, linearly polarized light provided by transmission through the reflective-type linearly polarizing plate, wherein the λ/4 plate has an in-plane retardation of 165±40 nm at a wavelength of 660 nm.

Specifically, the inventors have found that the above-described object is achieved with the following configurations.

(1) A plant-growth laminated film including:
a reflective-type linearly polarizing plate; and
a λ/4 plate that converts, into circularly polarized light, linearly polarized light provided by transmission through the reflective-type linearly polarizing plate, wherein the λ/4 plate has an in-plane retardation of 165±40 nm at a wavelength of 660 nm.

(2) The plant-growth laminated film according to (1), wherein the λ/4 plate has normal-wavelength-dispersion dependence.

(3) The plant-growth laminated film according to (1) or (2), wherein the reflective-type linearly polarizing plate has a higher reflection efficiency at a wavelength of 660 nm than at a wavelength of 450 nm.

(4) A plant-growth illumination apparatus including:
the plant-growth laminated film according to any one of (1) to (3); and
a light-emitting light source.

(5) The plant-growth illumination apparatus according to (4), wherein, in emitted light from the plant-growth illumination apparatus, a degree of circular polarization at a wavelength of 450 nm is lower than a degree of circular polarization at a wavelength of 660 nm.

The present invention provides a plant-growth laminated film and a plant-growth illumination apparatus that more efficiently provide circularly polarized light used for growth of plants.

DESCRIPTION OF THE PREFERRED EMBODIMENTS

Figure 1:
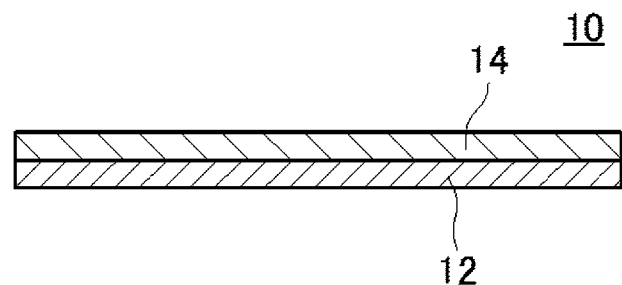
FIG. 1 is a sectional view schematically illustrating a plant-growth laminated film according to an embodiment of the present invention.

Hereinafter, a plant-growth laminated film and a plant-growth illumination apparatus according to the present invention will be described in detail. Incidentally, in this Specification, ranges defined by a value "to" a value include these values as the minimum value and the maximum value.

In this Specification, "orthogonal" and "parallel" include the range of errors tolerable in the technical field of the present invention. For example, "orthogonal" and "parallel" each include a range between ±10° (exclusive) relative to being strictly orthogonal or parallel; and such errors relative to being strictly orthogonal or parallel are preferably 5° or less, more preferably 3° or less.

In addition to "orthogonal" and "parallel", other angles such as specific angles of, for example, 15° or 45° also include the range of errors tolerable in the technical field of the present invention. For example, in the present invention, angles each include a range between ±5° (exclusive) relative to a specifically described strict angle; and such errors relative to a described strict angle are preferably ±3° (inclusive), preferably ±1° (inclusive).

Visible light is, among electromagnetic waves, light of wavelengths visible to the human eye, that is, light in the wavelength range of 380 nm to 780 nm. Invisible light is light in a wavelength range of less than 380 nm or light in a wavelength range of more than 780 nm.

In visible light, light in a wavelength range of 420 nm to 490 nm is blue light, light in a wavelength range of 495 nm to 570 nm is green light, and light in a wavelength range of 620 nm to 750 nm is red light; however, this is not limiting.

In infrared light, near-infrared light is electromagnetic waves in a wavelength range of 780 nm to 2500 nm. Ultraviolet light is light in a wavelength range of 10 to 380 nm.

In this Specification, $Re(\lambda)$ and $Rth(\lambda)$ respectively represent, at a wavelength λ, in-plane retardation and thickness-direction retardation. The wavelength λ is 550 nm unless otherwise specified.

In this Specification, $Re(\lambda)$ and $Rth(\lambda)$ are values measured with an AxoScan OPMF-1 (manufactured by OPTO SCIENCE, INC.) at a wavelength λ. To the AxoScan, an average refractive index $((Nx+Ny+Nz)/3)$ and a film thickness $(d(\mu m))$ are input, to thereby calculate the following.

$$Re(\lambda)=R0(\lambda)$$

$$Rth(\lambda)=((Nx+Ny)/2-Nz)\times d \qquad \text{Slow-axis direction}(°)$$

Incidentally, $R0(\lambda)$, which is displayed as a value calculated with the AxoScan, means $Re(\lambda)$.

In this Specification, refractive indices Nx, Ny, and Nz are measured with an Abbe refractometer (NAR-4T, manufactured by ATAGO CO., LTD.) with a light source that is a sodium lamp (λ=589 nm). When wavelength dependence is measured, it can be measured with a multi-wavelength Abbe refractometer DR-M2 (manufactured by ATAGO CO., LTD.) in combination with an interference filter.

Alternatively, values in Polymer Handbook (JOHN WILEY & SONS, INC) or catalogs of various optical films may be used. Examples of the average refractive index values of major optical films are as follows: cellulose acylate (1.48), cycloolefin polymer (1.52), polycarbonate (1.59), polymethyl methacrylate (1.49), and polystyrene (1.59).

A plant-growth laminated film according to the present invention includes
a reflective-type linearly polarizing plate, and
a λ/4 plate that converts, into circularly polarized light, linearly polarized light provided by transmission through the reflective-type linearly polarizing plate,
wherein the λ/4 plate has an in-plane retardation of 165±40 nm at a wavelength of 660 nm.

A plant-growth illumination apparatus according to the present invention includes the above-described plant-growth laminated film and a light-emitting light source.
Plant-Growth Laminated Film Hereinafter, a plant-growth laminated film according to a preferred embodiment of the present invention will be described with reference to a drawing.

FIG. 1 is a schematic sectional view of a plant-growth laminated film according to an embodiment of the present invention.

Incidentally, such drawings in the present invention are schematic views, and are not necessarily drawn to, for example, actual thickness relations or positional relations between layers. The same applies to the drawing described below.

As illustrated in FIG. 1, a plant-growth laminated film (hereafter, also referred to as a growth film) 10 has a reflective-type linearly polarizing plate 12, and a λ/4 plate 14.

Incidentally, the growth film 10 may have other functional layers of various types. For example, it may have an adhesive layer for bonding layers together.

The growth film 10 has the reflective-type linearly polarizing plate 12, and the λ/4 plate 14, so that, for light incident on the reflective-type linearly polarizing plate 12 side, the reflective-type linearly polarizing plate 12 transmits a first linearly polarized light component of the incident light, and reflects a second linearly polarized light component orthogonal to the first linearly polarized light component; and the λ/4 plate 14 converts, into circularly polarized light, the first linearly polarized light component having been transmitted by the reflective-type linearly polarizing plate 12.

Plant-Growth Illumination Apparatus

Hereinafter, a plant-growth illumination apparatus according to a preferred embodiment of the present invention will be described with reference to a drawing.

Figure 2:
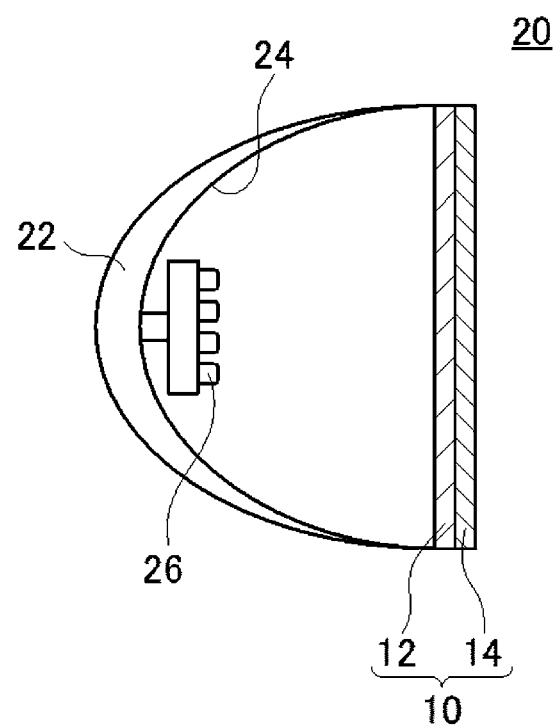
FIG. 2 is a sectional view schematically illustrating a plant-growth illumination apparatus according to an embodiment of the present invention.

FIG. 2 is a schematic sectional view of a plant-growth illumination apparatus according to an embodiment of the present invention.

As illustrated in FIG. 2, a plant-growth illumination apparatus (hereafter, also referred to as an illumination apparatus) 20 has a dome-shaped (hollow semi-sphere-shaped) housing 22, a reflective member 24 disposed on the inner surface of the housing 22, a light-emitting light source 26 disposed inside of the housing 22, and a growth film 10 disposed at the opening portion of the housing 22.

The growth film 10 is disposed such that its reflective-type linearly polarizing plate 12 side faces the light-emitting light source 26.

The light-emitting light source 26 is disposed in the inner bottom portion of the housing 22 such that the light-emitting surface faces the opening portion of the housing 22.

In the illumination apparatus 20 having such a configuration, the light-emitting light source 26 emits light in a predetermined wavelength range, and the light emitted from the light-emitting light source 26 directly enters the growth film 10 or is reflected by the reflective member 24 to enter the growth film 10.

As described above, in the growth film 10, the reflective-type linearly polarizing plate 12 transmits the first linearly polarized light component of incident light, and reflects the second linearly polarized light component orthogonal to the first linearly polarized light component; and the λ/4 plate 14 converts the first linearly polarized light component having been transmitted by the reflective-type linearly polarizing plate 12, into circularly polarized light and outputs the circularly polarized light.

The second linearly polarized light component reflected by the reflective-type linearly polarizing plate 12 is reflected by the reflective member 24 to enter again the reflective-type linearly polarizing plate 12. At this time, the second linearly polarized light component is reflected by the reflective member 24, so that the polarization state is changed. Thus, the growth film 10 also converts a part of light reflected by the reflective member 24 and reentered the growth film 10, into circularly polarized light and outputs the circularly polarized light. In other words, the other linearly polarized light component reflected by the reflective-type linearly polarizing plate 12 is reused by being reflected by the reflective member 24, to thereby further increase the use efficiency.

In the growth film 10 according to the present invention, the λ/4 plate 14 has an in-plane retardation of 165±40 nm at a wavelength of 660 nm. This enables an increase in the degree of circular polarization of light emitted from the illumination apparatus 20.

Incidentally, when the intensity of the right-circularly-polarized-light component of light is represented by $I_R$, and the intensity of the left-circularly-polarized-light component of light is represented by $I_L$, $|I_R-I_L|/(I_R+I_L)$ is defined as the degree of circular polarization.

The polarization state of light can be represented by the combination of right-circularly-polarized light and left-circularly-polarized light. For example, when left- and right-circularly-polarized-light components have the same intensity, the combination thereof provides linearly polarized light, and the electric vector oscillates in a direction depending on the phase difference between the left- and right-circularly-polarized light. When the right-circularly-polarized-light component and the left-circularly-polarized-light component have different intensities, they provide elliptically polarized light; when one of these components alone is present, it provides perfect circularly polarized light.

The sense of circularly polarized light is defined as follows: for an observer looking at oncoming light, polarization in which the tip of the electric field vector rotates clockwise as the time increases is right polarization, whereas polarization in which the tip rotates counterclockwise is left polarization.

The λ/4 plate's efficiency of conversion into circularly polarized light (hereafter, also referred to as circular polarization efficiency) is defined as, upon entry of linearly polarized light of a wavelength into the λ/4 plate, the degree of circular polarization of outgoing light.

Thus, when the outgoing light is composed of 100% of a right-circularly-polarized-light component, or 100% of a left-circularly-polarized-light component, the outgoing light has a degree of circular polarization of 100%, and the λ/4 plate also has a circular polarization efficiency of 100%. On the other hand, when the outgoing light is composed of 50% of a right-circularly-polarized-light component and 50% of a left-circularly-polarized-light component, the outgoing light has a degree of circular polarization of 0%, and the λ/4 plate also has a circular polarization efficiency of 0%.

In general, in wave plates such as λ/4 plates, since the phase differences of birefringence light vary depending on wavelengths, the wavelength for which a λ/4 plate functions is limited to a specific wavelength. Specifically, for example, a λ/4 plate designed for light of a wavelength of 550 nm does not perfectly function as a λ/4 plate for light of wavelengths of 450 nm and 660 nm, and the resultant outgoing light is elliptically polarized light. In other words, when it is designed to exhibit the highest circular polarization efficiency for light of a wavelength of 550 nm, it exhibits low circular polarization efficiencies for light of wavelengths of 450 nm and 660 nm.

As described above, growth of plants is promoted with red circularly polarized light (for example, circularly polarized light of a wavelength of 660 nm); however, irradiation with red light alone may adversely affect the morphologies such as the shape of leaves. For this reason, the irradiation is preferably performed together with light of another wavelength, such as, blue light of about 460 nm. Thus, light sources are configured to radiate light over wide wavelength ranges. However, it is difficult to provide increased circular polarization efficiency over such a wide emission wavelength range. Thus, the peak wavelength of the efficiency of the λ/4 plate (in other words, the wavelength of the highest circular polarization efficiency) has been set to about the center of the emission wavelength range of the light source, for example, 550 nm, to thereby ensure the circular polarization efficiency over the entirety of the emission wavelength range. However, this has not been sufficient.

By contrast, in the present invention, since the λ/4 plate has an in-plane retardation of 165±40 nm at a wavelength of 660 nm, the λ/4 plate has the highest circular polarization efficiency at about 660 nm. This enables a further increase in the ratio of red circularly polarized light in the light emitted from the illumination apparatus, which more efficiently provides the circularly polarized light used for growth of plants.

Incidentally, the polarization states of, for wavelengths, light emitted from a light source are measured with a spectrum meter or a spectral radiance meter equipped with circularly polarizing plates. In this case, the intensity of light measured through a right circularly polarizing plate corresponds to $I_R$, and the intensity of light measured through a left circularly polarizing plate corresponds to $I_L$. Ordinary light sources such as incandescent lamps, mercury lamps, fluorescent lamps, and LEDs (light emitting diodes) substantially emit natural light; the characteristic (polarization state) of light emitted from such a light source and passing through a growth film can be measured with, for example, a polarization phase-difference analyzer AxoScan manufactured by AXOMETRICS, Inc.

The λ/4 plate 14 preferably has, at a wavelength of 660 nm, an in-plane retardation of 165±40 nm, more preferably 165±30 nm, still more preferably 165±20 nm, particularly preferably 165±10 nm.

When such a range is satisfied, upon incident of light in an oblique direction on the λ/4 plate 14, for example, upon incident of light in a direction at 20° to 40° relative to a line perpendicular to a main surface of the λ/4 plate 14, the circular polarization efficiency for the light incident in the oblique direction becomes the highest at a wavelength of about 660 nm, which is preferred.

In the emitted light from the illumination apparatus, the degree of circular polarization at a wavelength of 450 nm is preferably lower than the degree of circular polarization at a wavelength of 660 nm.

The λ/4 plate 14 may exhibit normal-wavelength-dispersion dependence or reverse-wavelength-dispersion dependence, but preferably exhibits normal-wavelength-dispersion dependence.

When the λ/4 plate 14 is provided such that it exhibits normal-wavelength-dispersion dependence, and exhibits the highest circular polarization efficiency at a wavelength of 660 nm, a large amount of a circularly polarized light component of a sense opposite to the sense of circularly polarized light at a wavelength of 660 nm is included in a region at a wavelength of about 450 nm.

Reflective-Type Linearly Polarizing Plate

The reflective-type linearly polarizing plate 12 is means configured to transmit the first linearly polarized light component of incident light, and to reflect the second linearly polarized light component orthogonal to the first linearly polarized light component.

The reflective-type linearly polarizing plate is not particularly limited and may be appropriately selected in accordance with the purpose: examples include (1) a total-reflective-type polarizer, (2) a differently-birefringent-thin-film-laminated polarizer, (3) a wire-grid polarizer, (4) a thin-film polarizer, and (5) a birefringent polarizer. Of these, particularly preferred are (2) the differently-birefringent-thin-film-laminated polarizer and (3) the wire-grid polarizer because they enable a reduction in the size of the circularly polarized light illumination apparatuses.

In the reflective-type linearly polarizing plate, the reflection efficiency for light of a wavelength of 660 nm is preferably higher than the reflection efficiency for light of a wavelength of 450 nm.

This enables more accurate selection of the polarization state of red light, and enables a further increase in the efficiency of conversion of red light into circularly polarized light.

The reflection efficiency of a reflective-type linearly polarizing plate is "(intensity of the first linearly polarized light component—intensity of the second linearly polarized light component)/intensity of total light".

(1) Total-Reflective-Type Polarizer

The total-reflective-type polarizer is produced by combining crystals having optical axes (refractive-index axial characteristics) so as to cause total reflection depending on an incident polarization direction to thereby determine the polarization direction, and this polarizer exhibits very good polarization characteristics.

Examples of the total-reflective-type polarizer include a Glan-Thompson prism and a Glan-Taylor prism.

The Glan-Thompson prism is a polarizing prism made of calcite, and is a polarizer configured to receive an unpolarized beam to provide linearly polarized light.

The Glan-Taylor prism is a polarizing prism made of calcite, and is a polarizer that is configured to receive an unpolarized beam to provide linearly polarized light, and that exhibits good transmittance for short wavelengths.

(2) Differently-Birefringent-Thin-Film-Laminated Polarizer

Examples of the differently-birefringent-thin-film-laminated polarizer include that described in JP1997-506837A (JP-H9-506837A).

Specifically, when processing is performed under selected conditions so as to obtain the refractive-index relation, wide-ranging materials may be employed to form the polarizer. In general, one of the first materials needs to have, in a selected direction, a refractive index different from that of the second material. This difference between the refractive indices can be provided by various methods including stretching during formation of a film or after formation of a film, extrusion forming, or coating. In addition, the two materials preferably have similar rheological characteristics (for example, melt viscosity) so as to be extruded simultaneously.

A preferred combination includes the first material that is a crystalline or semi-crystalline organic polymer, and the second material that is an organic polymer. The second material may be crystalline, semi-crystalline, or amorphous, or may have birefringence opposite to that of the first material.

Specific preferred examples of the materials include polyethylene naphthalate (PEN) or isomers thereof (for example, 2,6-, 1,4-, 1,5-, 2,7-, or 2,3-PEN), polyalkylene terephthalate (for example, polyethylene terephthalate, polybutylene terephthalate, or poly-1,4-cyclohexanedimethylene terephthalate), polyimide (for example, polyacrylimide), polyetherimide, atactic polystyrene, polycarbonate, polymethacrylate (for example, polyisobutyl methacrylate, polypropyl methacrylate, polyethyl methacrylate, or polymethyl methacrylate), polyacrylate (for example, polybutyl acrylate, or polymethyl acrylate), cellulose derivatives (for example, ethylcellulose, acetylcellulose, cellulose propionate, acetylcellulose butyrate, or cellulose nitrate), polyalkylene polymers (for example, polyethylene, polypropylene, polybutylene, polyisobutylene, or poly(4-methyl) pentene), fluorinated polymers (for example, perfluoroalkoxy resin, polytetrafluoroethylene, fluorinated ethylene-propylene copolymers, polyvinylidene fluoride, or polychlorotrifluoroethylene), chlorinated polymers (for example, polyvinylidene chloride, or polyvinyl chloride), polysulfone, polyethersulfone, polyacrylonitrile, polyamide, silicone resin, epoxy resin, polyvinyl acetate, polyetheramide, ionomer resin, elastomer (for example, polybutadiene, polyisoprene, or neoprene), and polyurethane.

Examples of copolymers include PEN copolymers [for example, copolymers of (a) terephthalic acid or an ester thereof, (b) isophthalic acid or an ester thereof, (c) phthalic acid or an ester thereof, (d) alkane glycol, (e) cycloalkane glycol (for example, cyclohexanedimethanoldiol), (f) alkane dicarboxylic acid, and/or (g) cycloalkane dicarboxylic acid (for example, cyclohexanedicarboxylic acid), and 2,6-, 1,4-, 1,5-, 2,7-, and/or 2,3-naphthalenedicarboxylic acid or an ester thereof], copolymers of polyalkylene terephthalate [for example, copolymers of (a) naphthalenedicarboxylic acid or an ester thereof, (b) isophthalic acid or an ester thereof, (c) phthalic acid or an ester thereof, (d) alkane glycol, (e) cycloalkane glycol (for example, cyclohexanedimethanoldiol), (f) alkane dicarboxylic acid, and/or (g) cycloalkane dicarboxylic acid (for example, cyclohexanedicarboxylic acid), and terephthalic acid or an ester thereof], and styrene copolymers (for example, styrene-butadiene copolymers, or styrene-acrylonitrile copolymers), 4,4-bibenzoic acid, and ethylene glycol; or each layer may include a blend of two or more of the above-described polymers or copolymers (for example, a blend of SPS and atactic polystyrene).

In the case of a polarizer, examples of a particularly preferred combination of layers include PEN/co-PEN, polyethyleneterephthalate (PET)/co-PEN, PEN/SPS, PET/SPS, PEN/Eastair, and PET/Eastair.

The "co-PEN" means a copolymer or blend based on naphthalenedicarboxylic acid. The "Eastair" is polycyclohexanedimethylene terephthalate commercially available from Eastman Chemical Company.

The number of layers laminated is not particularly limited as long as, for economic reasons, a minimum number of layers are laminated to achieve desired optical characteristics, and may be appropriately selected in accordance with the purpose: in the case of a polarizer, the number of layers laminated is preferably 10,000 or less, more preferably 5,000 or less, still more preferably 2,000 or less.

The differently-birefringent-thin-film-laminated polarizer may be a commercially available product; and examples of the commercially available product include DBEF (trade name, manufactured by 3M).

(3) Wire-Grid Polarizer

The wire-grid polarizer is a polarizer that employs birefringence of metal fine wires so as to transmit one of polarized light, and to reflect the other.

The wire-grid polarizer includes metal wires periodically arranged, and is mainly used as a polarizer in the terahertz wave range. In order for a wire grid to function as a polarizer, the wire pitch needs to be sufficiently smaller than the wavelength of incidence electromagnetic waves.

In the wire-grid polarizer, metal wires are arranged at regular intervals. A polarized light component having a polarization direction parallel to the longitudinal direction of the metal wires is reflected by the wire-grid polarizer, whereas a polarized light component having a polarization direction perpendicular to the longitudinal direction is transmitted by the wire-grid polarizer.

The wire-grid polarizer may be a commercially available product; and examples of the commercially available product include a wire-grid polarizing filter 50×50, NT46-636 manufactured by Edmund Optics Inc.

(4) Thin-Film Polarizer

The thin polarizer is based on the incidence-angle dependence (Brewster angle) of the reflectivity of a dielectric thin film; the thin polarizer can be produced so as to have high power endurance and a large area, and is used for high-power laser devices, for example.

The thin polarizer may include a stack of a plurality of dielectric thin films having different refractive indices. The number of layers stacked is preferably 2 to 20, more preferably 2 to 12.

Examples of the material for a high-refractive-index dielectric thin film include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, $SiO$, $Ta_2O_5$, $TiO_2$, $TlCl$, $Y_2O_3$, $ZnSe$, $ZnS$, and $ZrO_2$. Of these, preferred are $Bi_2O_3$, $CeO_2$, $CeF_3$, $HfO_2$, $SiO$, $Ta_2O_5$, $TiO_2$, $Y_2O_3$, $ZnSe$, $ZnS$, and $ZrO_2$; particularly preferred are $SiO$, $Ta_2O_5$, $TiO_2$, $Y_2O_3$, $ZnSe$, $ZnS$, and $ZrO_2$.

Examples of the material for a low-refractive-index dielectric thin film include $Al_2O_3$, $BiF_3$, $CaF_2$, $LaF_3$, $PbCl_2$, $PbF_2$, $LiF$, $MgF_2$, $MgO$, $NdF_3$, $SiO_2$, $Si_2O_3$, $NaF$, $ThO_2$, and $ThF_4$. Of these, preferred are $Al_2O_3$, $BiF_3$, $CaF_2$, $MgF_2$, $MgO$, $SiO_2$, and $Si_2O_3$; particularly preferred are $Al_2O_3$, $CaF_2$, $MgF_2$, $MgO$, $SiO_2$, and $Si_2O_3$.

Incidentally, in the material for a dielectric thin film, the atomic ratio is also not particularly limited, and may be appropriately selected in accordance with the purpose. During formation of the film, the concentration of the atmospheric gas may be changed to control the atomic ratio.

The method of forming a dielectric thin film is not particularly limited, and may be appropriately selected in accordance with the purpose; examples of the method include physical vapor deposition (PVD) such as sputtering and vacuum vapor deposition such as ion plating and ion-beam deposition, and chemical vapor deposition (CVD). Of these, preferred are vacuum vapor deposition and sputtering, particularly preferred is sputtering.

Of the sputtering, preferred is DC (direct current) sputtering, which provides a high rate of forming films. Incidentally, DC sputtering is preferably performed with a material having high electroconductivity.

The thin polarizer may be a commercially available product; and examples of the commercially available product include TFP series (manufactured by Melles Griot KK).

(5) Birefringent Polarizer

The birefringent polarizer is a device configured to receive light at an angle relative to the optical axis of a birefringent crystal to provide light in different directions, and is used for optical communications. Examples of the birefringent polarizer include a Wollaston prism.

The Wollaston prism is provided by bonding together two birefringent crystals such as calcite such that their crystal axes are displaced from each other. This prism is configured to split light due to the difference between refractive indices based on polarization of light.

λ/4 Plate

The λ/4 plate is not particularly limited as long as it has an in-plane retardation of 165±40 nm at a wavelength of 660 nm, and may be appropriately selected in accordance with the purpose. Examples include stretched polycarbonate films, stretched norbornene-based polymer films, transparent oriented films containing inorganic particles having birefringence and composed of, for example, strontium carbonate, and thin films provided by oblique deposition of inorganic dielectric on supports.

The λ/4 plate (plate having a λ/4 function) is a plate having a function of converting linearly polarized light of a specific wavelength into circularly polarized light (or converting circularly polarized light into linearly polarized light). More specifically, the plate exhibits, at a predetermined wavelength λ nm, an in-plane retardation value of Re(λ)=λ/4 (or a value of λ/4 multiplied by an odd number). In other words, in the present invention, this equation holds at wavelengths of about 660 nm. Thus, the λ/4 plate according to the present invention converts, with higher efficiency, linearly polarized light of wavelengths of about 660 nm into circularly polarized light.

Examples of the λ/4 plate include (1) phase difference plates described in JP1993-27118A (JP-H5-27118A) and JP1993-27119A (JP-H5-27119A), and including a large-retardation birefringent film and a small-retardation birefringent film laminated such that their optical axes are orthogonal to each other; (2) a phase difference plate described in JP1998-68816A (JP-H10-68816A), and including a laminate of a polymer film that provides a λ/4 wavelength for a specific wavelength, and a polymer film that is composed of the same material as in the polymer film and that provides a λ/2 wavelength for the specific wavelength; (2) a phase difference plate described in JP1998-90521A (JP-H10-90521A), and including a laminate of two polymer films to thereby provide a λ/4 wavelength; (3) a phase difference plate described in WO2000/26705A, and using a modified polycarbonate film to provide a λ/4 wavelength; and (4) a phase difference plate described in WO2000/65384A and using a cellulose acetate film to provide a λ/4 wavelength.

Alternatively, the λ/4 plate may be formed from a liquid-crystal compound. More specifically, the λ/4 plate may be provided by orienting and curing a liquid-crystal compound having a polymerizable group to fix the orientation state.

The method of adjusting the in-plane retardation of the λ/4 plate is not limited. For example, the degree of orientation, Δn, and thickness may be adjusted to thereby control the in-plane retardation of the λ/4 plate.

The λ/4 plate 14 and the reflective-type linearly polarizing plate 12 are preferably bonded together such that the slow axis of the λ/4 plate 14 is set at 45°±10° relative to the polarization absorption axis of the reflective-type linearly polarizing plate 12. The bonding method is, for example, a method of using an adhesive film to perform lamination between rolls.

Light-Emitting Light Source

The light-emitting light source 26 is not particularly limited, and may be appropriately selected in accordance with the purpose; and examples include fluorescent lamps, LEDs, discharge lamps such as mercury lamps, tungsten lamps, laser lights, organic light-emitting diode (OLED) lamps, metal halide lamps (meta-hala), and xenon lamps. Of these, particularly preferred are LEDs from the viewpoint of efficiency.

Light of a wavelength obtained by emission may be used without being converted, or the light may be converted with a fluorescent body and used.

Incidentally, in the present invention, an LED is preferably used that emits light of wavelengths enabling highly efficient growth of plants. Specifically, a light source is preferably used that has wavelength-energy peaks in a wavelength range of 400 nm to 500 nm, and in a wavelength range of 600 nm to 700 nm; and a light source is preferably used that provides high energy at any one of or both of wavelengths of about 460 nm and about 660 nm. Alternatively, for example, a combination may be used that is constituted by a light source that provides high energy at a wavelength of about 460 nm, and a light source that provides high energy at a wavelength of about 660 nm.

Housing and Reflective Member

The housing is not limited, and may be selected from various housings used as housings of light sources in known illumination apparatuses.

The reflective member is not limited, and may be selected from various reflective members disposed inside of housings in known illumination apparatuses.

Other Members

An illumination apparatus according to the present invention may further have, as another member, as needed, an adiathermanous layer, a reflecting layer, a diathermanous layer, a heat conductive material, or a depolarization inhibition wall, for example.

Applications

An illumination apparatus according to the present invention radiates, in a large quantity, the right-circularly-polarized-light component of red light to thereby promote growth of plants, and also radiates blue light to thereby prevent adverse effects on the morphologies such as the shape of leaves.

Such an illumination apparatus according to the present invention inferentially has the following mechanism.

Phytochromobilin and flavin, which are chromophores included in photoreceptors such as phytochrome, cryptochrome, phototropin, and ZTL (ZEITLUPE) relating to, for example, promotion or inhibition of flower-bud formation or growth control of plants, are optically active compounds and hence have absorption dichroism for circularly polarized light in and near the wavelength range of light absorption. In other words, such a photoreceptor absorbs left or right circularly polarized light, and is less likely to absorb circularly polarized light of the other sense; thus, it is difficult for irradiation with this light to induce the function of the photoreceptor. Thus, cases of irradiation with left or right circularly polarized light alone inferentially result in a phenomenon of different degrees of growth. However, in general, such absorption dichroism is thought as a phenomenon observed in laboratory-level solution systems, and actually the phenomenon is thought not to occur because intracellular substances diffuse polarized light toward the chromophores to disturb the polarization state. However, surprisingly, in the present invention, it has been found that, even in leaves or stems including these substances, growth of plants can be controlled in accordance with the polarization state of radiated light.

Phytochrome, which relates to photoperiodism of plants, takes a red-light-absorbing form having a maximal absorption of about 660 nm, or a far-red-light-absorbing form having a maximal absorption of about 750 nm; and irradiation with light at about 660 nm transforms the red-light-absorbing form into the far-red-light-absorbing form. On the other hand, irradiation with light at about 750 nm transforms the far-red-light-absorbing form into the red-light-absorbing form. In addition, keeping in continuous darkness also promotes transformation from the far-red-light-absorbing form into the red-light-absorbing form. The amount of far-red-light-absorbing form generated by such reactions dictates the time of flowering. These reactions may be artificially controlled with, for example, illumination at night performed for cultivation of chrysanthemum, to thereby regulate the time of flowering. When this illumination is performed with an illumination apparatus according to the present invention including a light source radiating right-circularly-polarized light absorbed by phytochrome in the phytochrome's absorption wavelength range alone, a reduction in power consumption is achieved without lessening the effect provided by illumination.

On the earth, there are various plants and their chromophores of various types; thus, depending on such a plant and the purpose of regulation, the circularly-polarized-light wavelength range and the sense may be changed, which is important. Obviously, there are cases where simultaneous irradiation with circularly polarized light of different senses is preferred, for example, irradiation with right-circularly-polarized light for a wavelength and irradiation with left-circularly-polarized light for another wavelength range; also for such purposes, an illumination apparatus according to the present invention is applicable.

An illumination apparatus according to the present invention is usable in accordance with periods over growth of plants such as dormancy, germination, mature seedlings, cell-elongation periods, and flower-bud initiation, by exchanging growth films so as to change the polarization conversion wavelength range. In addition, depending on the time of day, the timing of irradiation, the intensity of light, or polarization state may be adjusted. In addition, for example, pulses of light may be emitted, or different portions of a plant may be irradiated with different polarization states. In addition, in plant factories, irradiation with light using an illumination apparatus according to the present invention may be combined with control on humidity, temperature, or gas concentration.

Method for Controlling Plant Growth

An illumination apparatus according to the present invention is applicable to a method for controlling plant growth.

The method for controlling plant growth includes promotion of plant growth and inhibition of plant growth.

The promotion of plant growth means, for example, an increase in the size of plant bodies due to elongation of, for example, plant height, stem length, or internodal length, or an increase in the length of lateral branches.

The effect of promoting plant growth enables a rapid increase in the weight or height of crops, to thereby improve the productivity. This also facilitates production of large crops. In addition, in breeding, rapid maturation is achieved, to thereby grow more generations, which is advantageous.

The inhibition of plant growth means, for example, dwarfing of plant bodies due to inhibition of elongation of, for example, plant height, stem length, or internodal length, or inhibition of elongation of lateral branches. The dwarfing means that plants have thicker and stouter stems and branches to have higher resistance to natural adverse conditions due to, for example, wind or rain, and also means that an increase is achieved in the unit-area amount of chlorophyll and nutrients such as vitamins.

The effect of inhibiting plant growth provides low heights, to thereby provide advantages of high resistance to wind damage due to, for example, typhoons, and high resistance to lodging even with increased grains. For example, in the case of rice, an increase is achieved in the number of rows of seedlings, to thereby further increase the unit-area seedling-transplantation density. Application of the effect to fruit trees having a height of several meters (such as banana or mango) and palm trees (such as date palm or coconut) facilitates work of harvesting fruits. In addition, sizes smaller than ordinary sizes provide advantages such as an increase in commercial values as cut flower, foliage plants, or bonsai plants, and attraction for consumers.

In the method for controlling plant growth, adjustment of timing of irradiation (the time of day, or periods over growth (such as dormancy, germination, mature seedlings, or cell-elongation periods)), pulsed illumination, and the polarization conversion wavelength range are preferably changed in accordance with the time of day and periods over growth. Depending on the plant and purpose, adjustment of timing of irradiation, pulsed illumination, and the polarization conversion wavelength range are changed. Some portions are irradiated. In addition, such irradiation may be combined with controls on humidity, temperature, gas concentration, illuminance, and time for irradiation.

Specifically, also for photoperiodic flower-bud formation, a reversion reaction, chloroplast movement, opening of spaces, flavonoid biosynthesis, and plant disease control (a method of applying UV to improve resistance to disease), irradiation with the effective one of circularly polarized light enables a reduction in UV damage.

Other examples include phototropic curvature, turning on or off of gene transcription, regulation of gene expression, regulation of secondary metabolites (nutrient components, flavor components, umami, antioxidant substances, and medicinal components), application of stress, DNA photo-reactivation, and a blue-light bio-switch.

Target Plants

Target plants of the method for controlling plant growth are not particularly limited, and may be appropriately selected in accordance with the purpose. Examples include vegetables such as Cucurbitaceae, Solanaceae, Leguminosae, Rosaceae, Cruciferae, Compositae, Umbelliferae, Chenopodiaceae, Gramineae, Malvaceae, Araliaceae, Labiatae, Zingiberaceae, Nymphaeaceae, and Araceae; cut-flower plants and flowering potted plants such as Compositae, Rosaceae, Araceae, Caryophyllaceae, Cruciferae, Plumbaginaceae, Gentianaceae, Scrophulariaceae, Leguminosae, Paeoniaceae, Iridaceae, Solanaceae, Amaryllidaceae, Orchidaceae, Agavaceae, Cornaceae, Rubiaceae, Salicaceae, Ericaceae, Oleaceae, Magnoliaceae, Primulaceae, Begoniaceae, Labiatae, Geraniaceae, Crassulaceae, Ranunculaceae, Gesneriaceae, Cactaceae, Pteropsida, Araliaceae, Moraceae, Commelinaceae, Bromeliaceae, Marantaceae, Euphorbiaceae, Piperaceae, *Euphorbia pekinensis* Rupr., Saxifragaceae, Onagraceae, Malvaceae, Myrtaceae, Theaceae, and Nyctaginaceae; fruit trees such as Rosaceae, Vitaceae, Moraceae, Moraceae, Ericaceae, Lardizabalaceae, Lardizabalaceae, Passifloraceae, Rutaceae, Anacardiaceae, Bromeliaceae, and Myrtaceae; and algae.

More specifically, examples include vegetables such as cucumber, melon, *Cucurbita*, balsam pear, zucchini, watermelon, oriental pickling melon, wax gourd, rag gourd, vegetable spaghetti, tomato, sweet pepper, red pepper, egg plant, pepino, *Capsicum annuum, Pisum sativum, Phaseolus vulgaris, Vigna sinensis*, green soybeans, *Vicia faba, Psophocarpus tetragonolobus*, snap beans, string beans, hyacinth beans, strawberry, corn, okra, broccoli, white radish sprouts, water-cress, *Brassica campestris* var. *perviridis, Brassica campestris*, lettuce, butterbur, garland chrysanthemum, edible chrysanthemum, celery, parsley, honewort, dropwort, Welsh onion, *Allium fistulosum* var. *caespitosum*, chinese chive, asparagus, spinach, *Salsola komarovii*, udo, perilla, ginger, Japanese radish, turnip, wasabi, radish, rutabaga, small turnip, garlic, *Allium chinense*, lotus root, and taro; flowering plants such as aster, *Rhodanthe manglesii*, thistle, pink, stock, flower vegetables, statice, prairie gentian, snapdragon, sweet pea, Japanese iris, chrysanthemum, *Liatris*, gerbera, marguerite, *Aster savatieri*, Shasta daisy, carnation, *Gypsophila paniculata* L., gentian, peony, Chinese lantern, chelone, dahlia, calla, gladiolus, iris, freesia, tulip, narcissus, amaryllis, cymbidium, *Dracaena*, rose, Japanese quince, Japanese cherry, peach, Japanese apricot, *Spiraea cantoniensis, Rubus*, mountain ash, dogwood, Japanese cornel, Chinese ixora, bouvardia, willow, *Rhododendron*, golden bell, magnolia, cineraria, cape marigold, *Primula*, petunia, begonia, gentian, *Coleus*, geranium, *Pelargonium*, rochea, anthurium, clematis, lily of the valley, *Saintpaulia*, cyclamen, *Ranunculus*, gloxinia, *Dendrobium, Cattleya, Phalaenopsis, Vanda, Epidendrum, Oncidium, Schlumbergera truncata, Schlumbergera russelliana*, epiphyllum, *Kalanchoe, Nephrolepis, Adiantum, Asplenium*, pothos, *Dieffenbachia, Spathiphyllum, Syngonium, Chlorophytum comosum, Schefflera*, hedera, rubber tree, *Dracaena, Cordyline*, bridal veil, *Ananas, Calathea*, croton, *Peperomia*, poinsettia, hydrangea, *Fuchsia*, hibiscus, gardenia, *Leptospermum*, camellia, bougainvillea, and tree peony; fruit trees such as Japanese pear, peach, cherry, plum, apple, prune, nectarine, apricot, raspberry, Japanese apricot, grape, fig, *Diospyros kaki*, blueberry, *Akebia quinata*, kiwi fruit, passion fruit, *Eriobotrya japonica, Citrus unshiu*, murcott, lemon, *Citrus junos, Citrus medica* var. *sarcodactylis, Citrus hassaku*, shaddock, *Citrus hanayu*, kumquat, seminole, *Citrus iyo*, navel orange, Encore, Nova, *Citrus tamurana*, lime, *Citrus sudachi, Citrus sphaerocarpa, Citrus grandis* (Banpeiyu), *Citrus tankan* Hayata, mango, pineapple, and guava; and algae.

Of these, particularly preferred are green vegetables and *Brassica campestris* var. *perviridis* (komatsuna).

Plant-growth laminated films and plant-growth illumination apparatuses according to the present invention have been described so far in detail. However, it is obvious that the present invention is not limited to these examples, and various modifications and changes can be made without departing from the spirit and scope of the present invention.

EXAMPLES

Hereinafter, features of the present invention will be further described in detail with reference to Examples. In the following Examples, for example, the materials, reagents, amounts of use, amounts of substances, ratios, contents of treatments, and procedures of treatments may be appropriately changed without departing from the spirit and scope of the present invention. Therefore, the scope of the present invention should not be understood as being limited to the following specific examples.

Example 1

As Example 1, an illumination apparatus 20 in FIG. 2 was produced.
Reflective-Type Linearly Polarizing Plate As the reflective-type linearly polarizing plate, a reflective polarizer having a polymer multilayered film structure was used.

This reflective-type linearly polarizing plate exhibits the highest reflection efficiency at a wavelength of 660 nm.
λ/4 Plate The λ/4 plate employed was a commercially available polymer phase difference film #88-252, manufactured by Edmund Inc.

The in-plane retardation at 660 nm of this λ/4 plate was measured and found to be 150 nm.
Plant-Growth Laminated Film The reflective-type linearly polarizing plate and the λ/4 plate were bonded together such that the transmission axis of the polarizer and the slow axis of the λ/4 plate form 45°, to produce a plant-growth laminated film.
Plant-Growth Illumination Apparatus As the light-emitting light source (and the housing and the reflective member), a commercially available reflecting-diffuser-plate-equipped white LED lamp (PAR30, manufactured by Beautiful Light Technology Corporation) was used. At the emission plane of this white LED lamp, the plant-growth laminated film was disposed to produce a plant-growth illumination apparatus.

Incidentally, the plant-growth laminated film was disposed such that its reflective-type linearly polarizing plate side faced the emission plane of the white LED lamp.

The white LED lamp had a peak wavelength of 660 nm in the red range, and a peak wavelength of 460 nm in the blue range.

Examples 2 to 4 and Comparative Examples 1 and 2

Plant-growth illumination apparatuses were each produced as in Example 1 except that the wavelength of the highest reflection efficiency in the reflective-type linearly polarizing plate, the in-plane retardation of the λ/4 plate at 660 nm, and the angle formed between the transmission axis of the polarizer and the slow axis of the λ/4 plate were changed as described in Table 1.

Incidentally, in Table 1, the wavelength of the highest reflection efficiency in the reflective-type linearly polarizing plate is referred to as "Polarizing-plate peak wavelength", the in-plane retardation of the λ/4 plate is referred to as "Wave-plate retardation", and the angle formed between the transmission axis of the polarizer and the slow axis of the λ/4 plate is referred to as "Slow-axis angle".
Evaluations The illumination apparatuses produced in Examples and Comparative Examples were evaluated in terms of the degree of circular polarization of emitted light and plant-growth promotion effects.
Degree of Circular Polarization The polarization states of, for wavelengths, light emitted from such an illumination apparatus were determined with a polarization phase-difference analyzer AxoScan manufactured by AXOMETRICS.

The degree of circular polarization of emitted light at a wavelength of 660 nm, and the degree of circular polarization of emitted light at a wavelength of 450 nm are described in Table 1.
Plant-Growth Promotion Effects Each illumination apparatus produced was used to continuously radiate emitted light from the illumination apparatus for 38 days to cultivate komatsuna; after that, the weight of the komatsuna was measured and the increase in the weight from pre-radiation was determined; and the growth promotion effects were evaluated in accordance with the following grading system. The results are described in Table 1.

Relative to the increase in the weight of the plant in Comparative Example 1, cases of a 20% or more increase in the weight were evaluated as "Significant growth promotion effects", and cases of a 0% or more and less than 20% increase in the weight were evaluated as "No growth promotion effects".

TABLE 1

| | | | | Evaluations | | |
|---|---|---|---|---|---|---|
| | Polarizing-plate | Wave-plate | Slow- | Degree of circular polarization | | |
| | peak wavelength nm | retardation nm | axis angle ° | 660 nm % | 450 nm % | Growth promotion effects |
| Example 1 | 600 | 150 | 45 | 70 | 30 | Significant |
| Example 2 | 530 | 150 | 45 | 60 | 40 | Significant |
| Example 3 | 600 | 132.5 | 45 | 60 | 40 | Significant |
| Example 4 | 600 | 150 | 40 | 65 | 25 | Significant |
| Comparative Example 1 | 600 | 120.0 | 45 | 50 | 50 | No |

Table 1 demonstrates that the illumination apparatuses in Examples 1 to 4 according to the present invention provide better plant-growth promotion effects.

This has demonstrated advantages provided by the present invention.

REFERENCE SIGNS LIST 10 plant-growth laminated film
12 reflective-type linearly polarizing plate
14 λ/14 plate
20 plant-growth illumination apparatus
22 housing
24 reflective member
26 light-emitting light source

What is claimed is:

1. A plant-growth laminated film comprising:
a reflective-type linearly polarizing plate; and
a λ/4 plate that converts, into circularly polarized light, linearly polarized light provided by transmission through the reflective-type linearly polarizing plate,
wherein the λ/4 plate has an in-plane retardation of 165±40 nm at a wavelength of 660 nm.

2. The plant-growth laminated film according to claim 1, wherein the λ/4 plate has normal-wavelength-dispersion dependence.

3. The plant-growth laminated film according to claim 1, wherein the reflective-type linearly polarizing plate has a higher reflection efficiency at a wavelength of 660 nm than at a wavelength of 450 nm.

4. The plant-growth laminated film according to claim 2, wherein the reflective-type linearly polarizing plate has a higher reflection efficiency at a wavelength of 660 nm than at a wavelength of 450 nm.

5. A plant-growth illumination apparatus comprising:
the plant-growth laminated film according to claim 1; and
a light-emitting light source.

6. A plant-growth illumination apparatus comprising:
the plant-growth laminated film according to claim 4; and
a light-emitting light source.

7. The plant-growth illumination apparatus according to claim 5, wherein, in emitted light from the plant-growth illumination apparatus, a degree of circular polarization at a wavelength of 450 nm is lower than a degree of circular polarization at a wavelength of 660 nm.

8. The plant-growth illumination apparatus according to claim 6, wherein, in emitted light from the plant-growth illumination apparatus, a degree of circular polarization at a wavelength of 450 nm is lower than a degree of circular polarization at a wavelength of 660 nm.

* * * * *